United States Patent [19]
Meisinger et al.

[11] Patent Number: 6,073,974
[45] Date of Patent: Jun. 13, 2000

[54] HIGH PRESSURE COUPLING

[75] Inventors: Stanlee W. Meisinger, Golden Valley; Robert B. Danielson, Mahtomedi, both of Minn.

[73] Assignee: Fastest, Inc., St. Paul, Minn.

[21] Appl. No.: 09/090,790

[22] Filed: Jun. 4, 1998

[51] Int. Cl.[7] .................................................. F16J 15/00
[52] U.S. Cl. ............................................ 285/86; 285/316
[58] Field of Search .................................. 285/316, 322, 285/315, 86; 137/614.03; 251/149.3

[56] References Cited

U.S. PATENT DOCUMENTS

| | | | |
|---|---|---|---|
| 3,039,794 | 6/1962 | De Cenzo | 285/86 X |
| 3,442,541 | 5/1969 | Metz | 285/86 X |
| 3,964,771 | 6/1976 | Baudouin | 285/315 |
| 4,086,939 | 5/1978 | Wilcox et al. | 137/614.03 |
| 5,209,528 | 5/1993 | Weh et al. | |
| 5,575,510 | 11/1996 | Weh et al. | |
| 5,706,967 | 1/1998 | Weh et al. | |

FOREIGN PATENT DOCUMENTS

| | | | |
|---|---|---|---|
| 1605077 | 11/1990 | U.S.S.R. | 285/316 |
| 96/22488 | 7/1996 | WIPO | |

*Primary Examiner*—Terry Lee Melius
*Assistant Examiner*—Greg Binda
*Attorney, Agent, or Firm*—Merchant & Gould P.C.

[57] ABSTRACT

A high pressure coupling includes a tubular piston having a longitudinal axis and first and second opposite ends, with the tubular piston being moveable between a disengaged position and a pressurized position. A coupling mechanism surrounds the first end of the tubular piston, with the coupling mechanism including an un-coupled configuration and a coupled configuration. A sleeve is engaged with the coupling mechanism for controlling operation of the coupling mechanism. The sleeve is moveable between a first position at which the coupling mechanism is in the un-coupled configuration and a second position at which the coupling mechanism is in the coupled configuration. A detent mechanism is provided which is actuatable by the tubular piston. The detent mechanism is engageable with the sleeve at the disengaged position of the tubular piston to hold the sleeve at the first position and the detent mechanism is engageable with the sleeve at the pressurized position of the tubular piston to hold the sleeve at the second position.

29 Claims, 8 Drawing Sheets

HIGH PRESSURE COUPLING

FIELD OF THE INVENTION

The present invention relates generally to couplings for use with pressurized fluid systems. More particularly, the present invention relates to high pressure couplings for providing quick connections with high pressure fluid lines.

BACKGROUND OF THE INVENTION

Quality control systems provide a significant demand for quick connect couplings. In this regard, quick connect couplings are often used to facilitate testing manufactured products for leaks and/or for filling containers. In use, the couplings provide a quick connection to test pieces such as products that hold a fluid or products designed to work under pressure or vacuum. Once the connection is made, a test fluid is communicated through the coupling to the test piece to determine if the test piece has any leaks. In order to maximize production efficiency, it is important that the couplings provide fast and reliable seals to prevent fluid leakage from the coupling.

The couplings are often utilized in connection with high pressure fluids, and therefore safety is a factor that must be considered. Couplings have been designed so that they do not come off while under pressure, thereby increasing safety for individuals as well as providing protection for surrounding equipment.

There is a continuing need, however, for improved high pressure couplings that provide increased safety.

SUMMARY OF THE INVENTION

The present invention provides an improved high pressure coupling providing a quick, fluid tight connection to a fluid line. The high pressure coupling is designed to handle high pressures and is provided with a mechanism to prevent the coupling from coming off under pressure, thereby enhancing the safety of the coupling.

In one embodiment of the high pressure coupling in accordance with the invention, the coupling includes a tubular piston having a longitudinal axis and first and second opposite ends, with the tubular piston being moveable between a disengaged position and a pressurized position. A coupling mechanism surrounds the first end of the tubular piston, with the coupling mechanism including an uncoupled configuration and a coupled configuration. A sleeve is engaged with the coupling mechanism for controlling operation of the coupling mechanism. The sleeve is moveable between a first position at which the coupling mechanism is in the uncoupled configuration and a second position at which the coupling mechanism is in the coupled configuration. A detent mechanism is provided which is actuatable by the tubular piston. The detent mechanism is engageable with the sleeve at the disengaged position of the tubular piston to hold the sleeve at the first position and the detent mechanism is engageable with the sleeve at the pressurized position of the tubular piston to hold the sleeve at the second position.

Since the sleeve is held at the first position by the coupling mechanism, a more reliable connection of the coupling with a fluid line is achieved since the coupling mechanism cannot engage with the fluid line until the detent mechanism releases the sleeve from the first position. Further, by holding the sleeve at the second position when the tubular piston is actuated to the pressurized position by high pressure fluid, the coupling is prevented from being disconnected while under pressure.

In accordance with another embodiment of the high pressure coupling of the invention, the coupling includes a tubular piston having a longitudinal axis and first and second opposite ends, with the tubular piston being moveable between a disengaged position and a pressurized position. A coupling mechanism surrounds the first end of the tubular piston, with the coupling mechanism including an uncoupled configuration and a coupled configuration. A sleeve is engaged with the coupling mechanism for controlling operation of the coupling mechanism. The sleeve is moveable between a first position at which the coupling mechanism is in the uncoupled configuration and a second position at which the coupling mechanism is in the coupled configuration. A sleeve locking mechanism is actuatable by the tubular piston, and the sleeve locking mechanism is engageable with the sleeve at the pressurized position of the tubular piston to hold the sleeve at the second position. The first end of the tubular piston includes a pressure surface which faces towards the fluid line such that the movement of tubular piston from the disengaged position to the pressurized position occurs in a direction away from the fluid line when the pressure surface is acted upon by a pressurized fluid.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

DETAILED DESCRIPTION OF THE PREFERRED EMBODIMENT(S)

One embodiment of a high pressure coupling 10 in accordance with the present invention is shown in FIGS. 1–5, where it can be seen that the coupling 10 includes a tubular piston 12, a piston guide 14, a body member 16, a split collet assembly 18, and a generally hollow, exterior sleeve 20, each of which is generally cylindrical in shape.

Figure 1:
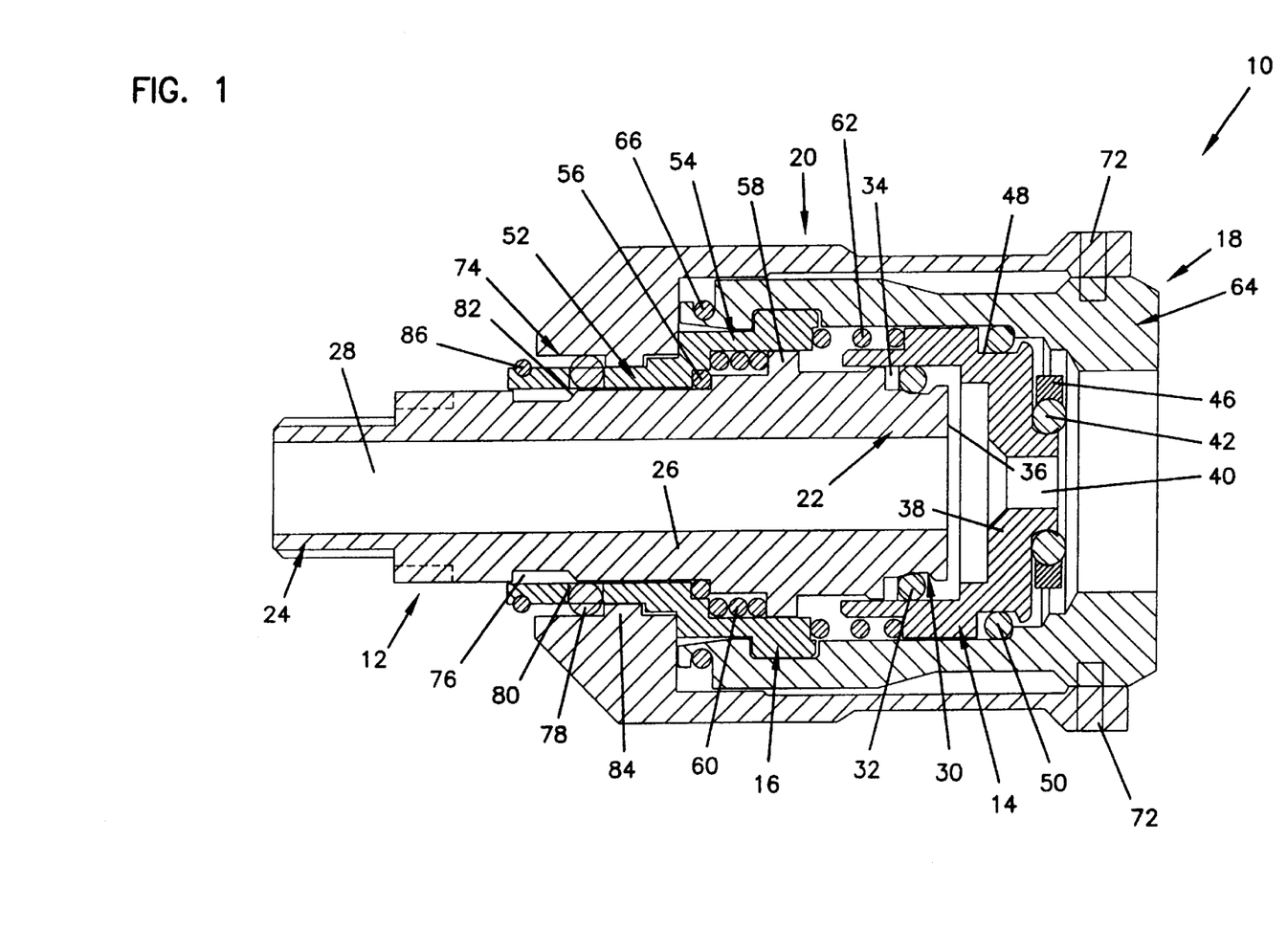
FIG. 1 is a longitudinal cross-sectional view of a high pressure coupling in accordance with the present invention.
Figure 2:
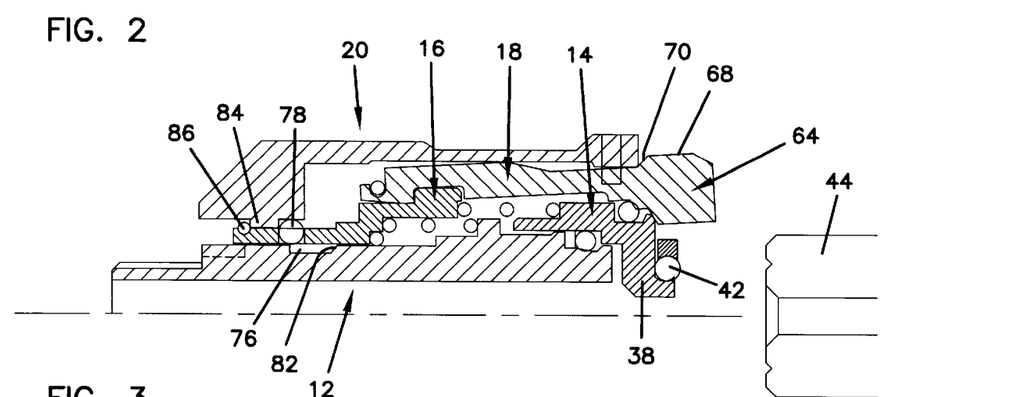
FIG. 2 is a longitudinal cross-sectional view of the upper portion of the high pressure coupling of FIG. 1, in a fully open, disengaged position.
Figure 4:
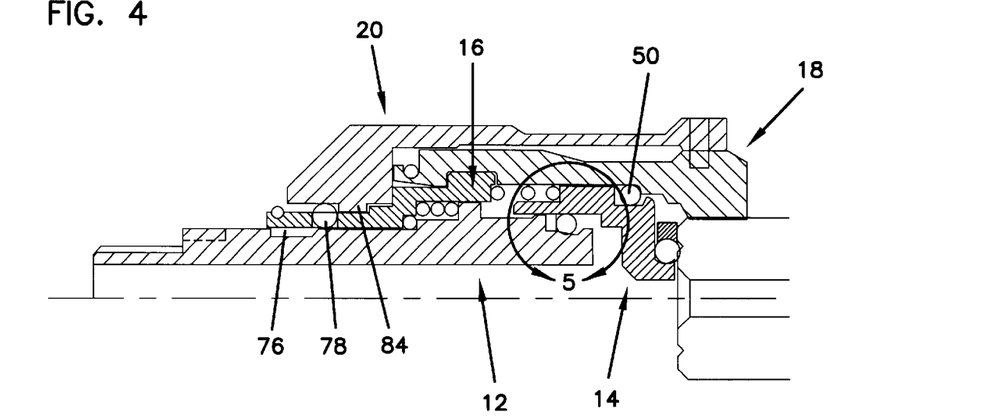
FIG. 4 is a view similar to FIG. 3, but with the coupling pressurized.

The tubular piston 12 is generally elongated and is moveable in a direction along its longitudinal axis between a disengaged position, shown in FIG. 2, and a pressurized position, shown in FIG. 4. The piston 12 includes an end 22 that is slideably disposed within the piston guide 14, an opposite end 24 that extends beyond the end of the sleeve 20, and a central portion 26 between the two ends 22,24. The tubular piston further includes a central fluid passageway 28 to allow passage of high pressure fluid therethrough. A circumferential groove 30 is formed in the exterior surface of the piston 12 adjacent the end 22 thereof, and an o-ring seal 32 is disposed within the groove 30 to prevent fluid leakage between the exterior of the piston 12 and the interior surface of the piston guide 14. A back-up ring 34 disposed within the groove 30 prevents the o-ring seal 32 from extruding.

Figure 5:
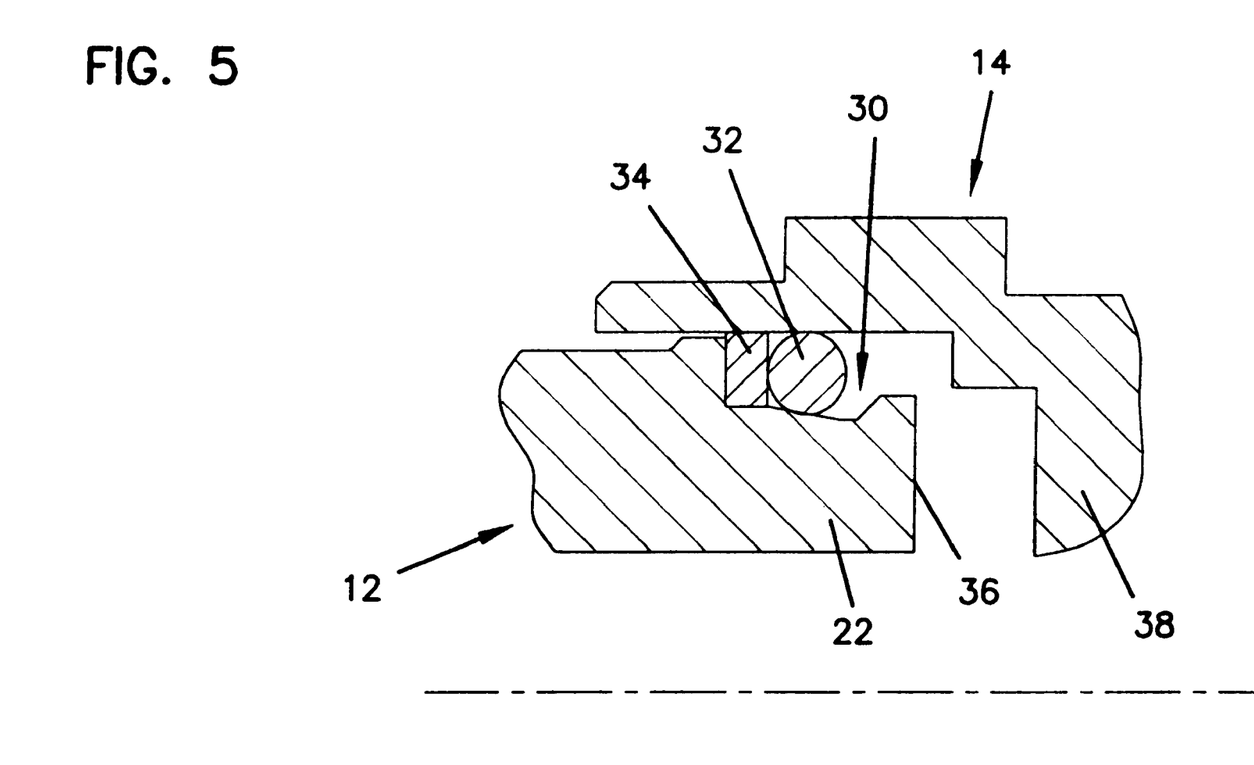
FIG. 5 is a detailed view of the portion within circle 5 of FIG. 4.

As is seen in detail in FIG. 5, the circumferential groove 30 is sloped downward from left to right such that as the piston 12 moves to the left, relative to the piston guide 14, the squeeze on the o-ring 32 becomes less, thereby decreasing the friction force acting on the piston 12 to allow the piston to more easily move to the left relative to the piston guide 14 due to less friction force acting on the piston. The groove 30 need not be sloped however, but could instead be of constant diameter.

The end 22 of the piston 12 includes a pressure surface 36, as shown in FIGS. 1–5, which is acted upon by high pressure fluid during use of the coupling 10 to thereby force the piston to the left, for a purpose which will be described below.

As mentioned previously, the piston guide 14 surrounds the end 22 of the piston 12 and is slideable relative thereto. The piston guide 14 includes an extension portion 38 that extends beyond the end 22 of the piston and which faces the pressure surface 36. A central passageway 40 is formed through the extension portion 38 to allow fluid flow through the piston guide 14 and into the passageway 28 of the piston. A main seal 42 is disposed at the front end of the extension portion 38 for sealing engagement with an end surface of a fluid line 44. The main seal 42, which can be an o-ring or other similar type of seal, provides a fluid tight connection between the coupling 10 and the fluid line 44, to prevent fluid leakage from the coupling. The main seal 42 can be retained on the extension portion 38 in any suitable manner, such as by a retainer 46 disposed around the outer perimeter of the main seal 42.

The piston guide 14 is further provided with a circumferential groove 48 in the outer surface thereof, and a collet engaging member 50 is disposed within the groove 48 to hold the split collet assembly 18 open. The collet engaging member 50, as shown in the figures, is an o-ring, but it can also be a washer, sleeve and the like. The groove 48 is oversized relative to the size of the collet engaging member 50 such that the member is able to move back and forth within the groove. The operation of the member 50 and its movements within the groove 48 will be more fully described later in the description.

The body member 16 is also generally tubular, and includes a first, small diameter portion 52 closely surrounding the outer surface of the piston 12 at the central portion 26 thereof, and a second, large diameter stepped portion 54 spaced from the outer surface of the piston. A resilient o-ring 56 is provided between the body member 16 and the piston 12 thereby forming a cushion therebetween to absorb shocks as the piston is actuated by high pressure fluid to the pressurized position. The outer surface of the piston 12 includes a shoulder 58 extending radially therefrom, and a coil spring 60 is engaged between the large diameter stepped portion 54 and the shoulder 58 in order to bias the piston 12 toward the right in FIG. 1. A further coil spring 62 is engaged between the front end of the stepped portion 54 and the piston guide 14 in order to bias the piston guide toward the right in FIG. 1. Each of the springs 60,62 is disposed out of the fluid flow path, and sealed from the working fluid by the seal 32, such that the springs 60,62 are not wetted by the working fluid. This permits a smoother fluid flow through the coupling 10, as well as preventing contamination build-up by the springs.

The split collet assembly 18 is connected to the stepped portion 54 of the body member 16 and surrounds the piston guide 14 for coupling the fluid line 44 to the coupling 10. The split collet assembly 18 includes a plurality of individual collet segments arranged in a circumferential manner around the piston guide 14 and disposed for clamping engagement with the fluid line 44. The split collet assembly 18 is connected to the stepped portion 54 in a manner allowing pivoting movement of the collet segments, whereby a distal end portion 64 of the split collet assembly is expandable and contractable between an un-coupled position and a coupled position, respectively, as is evident from FIGS. 2 and 3. An elastic retainer 66, such as an o-ring or garter spring, is secured to the end of the split collet assembly opposite the distal end portion 64 in order to bias the distal end portion of the split collet assembly to the expanded position.

Figure 3:
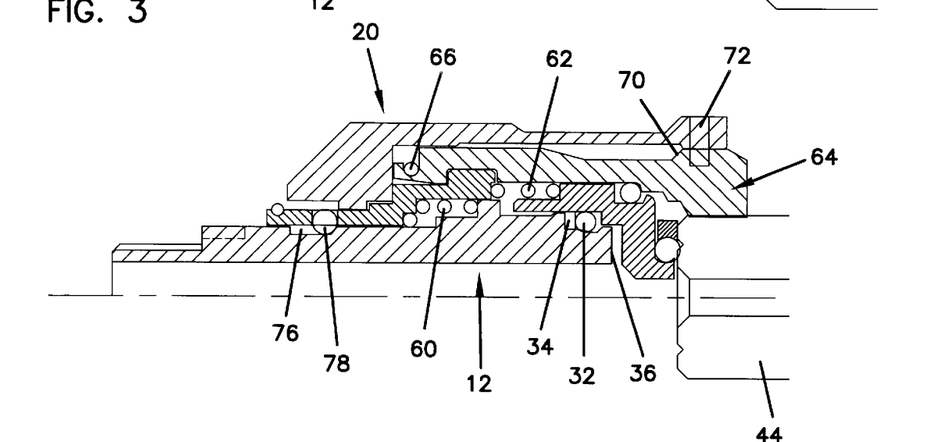
FIG. 3 is a view similar to FIG. 2, with the coupling in a connected position and not pressurized.
Figure 6:
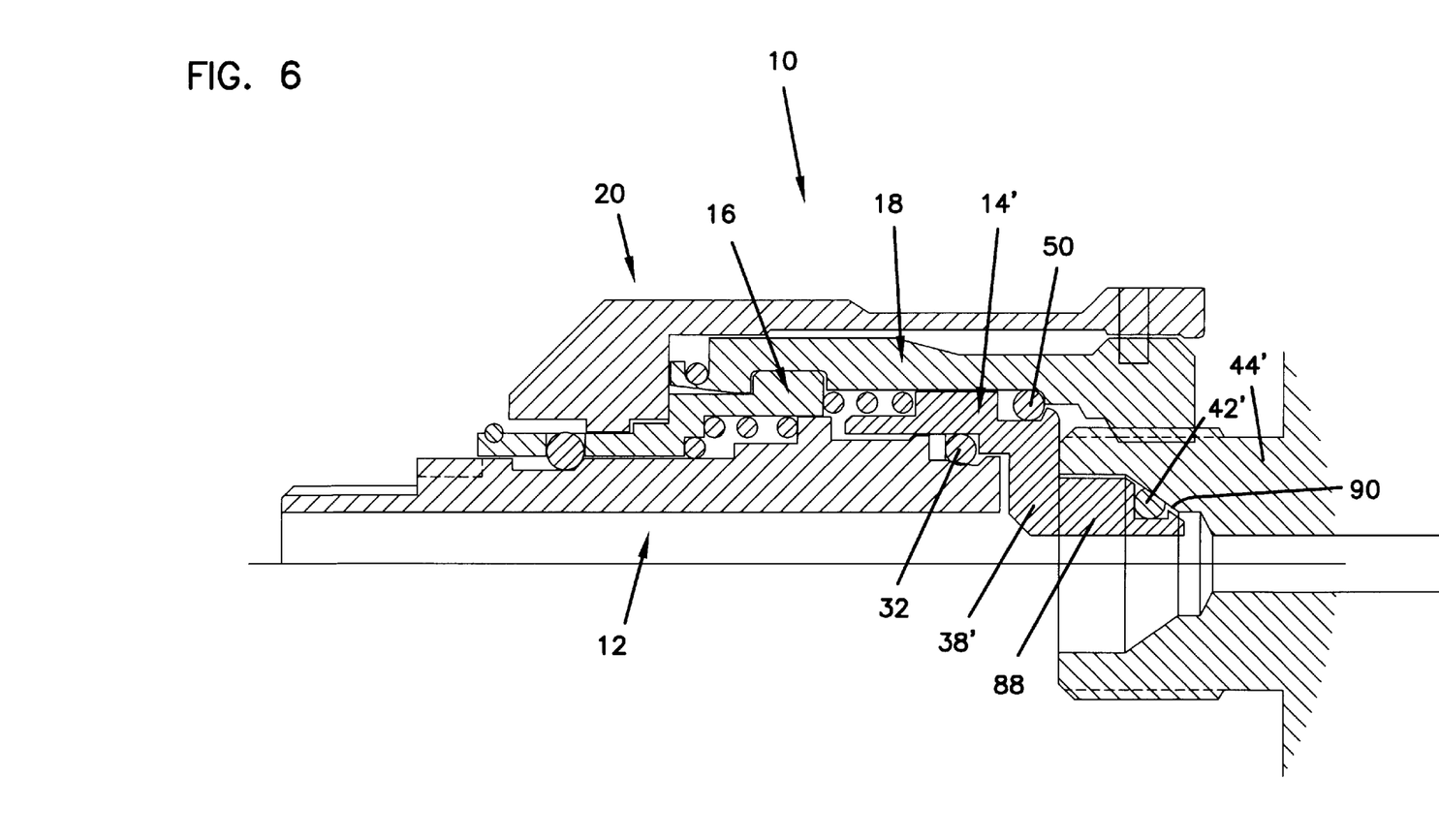
FIG. 6 illustrates another embodiment of the high pressure coupling.

As is shown in FIGS. 2–4, the distal end portion 64 of the split collet assembly is adapted to grip onto the exterior surface of the fluid line 44 in order to securely connect the coupling 10 and the fluid line. In order to aid in the gripping effect, the interior surfaces of the individual collet segments can be provided with threads at the distal end which mate with threads formed on the outer surface of the fluid line 44, as is illustrated in the embodiment of FIG. 6, to enhance the connection between the coupling and the fluid line. In place of mating threads on the collet segments and the fluid line, the collet segments could be formed with shoulders arranged to grip behind a shoulder defined on the fluid line to provide the connection therebetween.

The sleeve 20 surrounds the piston 12, the piston guide 14, the body member 16 and the split collet assembly 18, and is slideable relative to the split collet assembly in order to actuate the distal end portion 64 to the contracted position, as well as to allow expansion of the distal end portion by the elastic retainer 66. As can be seen in FIGS. 1–4, the front portion of the sleeve 20 is slideably disposed on the exterior surface of the split collet assembly adjacent to the distal end portion 64, and the outer surface of the distal end portion 64 defines an enlarged diameter portion 68 and a ramped surface 70 leading to the enlarged diameter portion 68. As the sleeve 20 slides to the right relative to the split collet assembly 18, the inner surface of the sleeve slides up the ramped surface 70 and onto the enlarged diameter portion 68, thereby forcing the distal end portion 64 to the contracted position and into clamping engagement with the fluid line 44. By moving the sleeve 20 to the left and down the ramped surface 70, the distal end portion 64 is allowed to expand, due to the expansion force of the elastic retainer 66, to permit disconnection or connection of the coupling and the fluid line.

Pins or other protuberances 72 are connected to the sleeve 20 and extend down into engagement with the split collet assembly 18 in a manner to cause integral rotational movement of both the sleeve and the split collet assembly when the sleeve is rotated, while permitting the sleeve to slide back and forth relative to the split collet assembly. The pins 72 are used to rotate the split collet assembly 18 and thereby tighten up the coupling 10 onto the fluid line 44 due to the threaded engagement therebetween. The pins 72, however, are not required, but they can be beneficial if the coupling 10 leaks and needs to be tightened.

A detent mechanism 74 is provided to hold the sleeve 20 at a first position, shown in FIG. 2, at which the distal end portion of the split collet assembly is expanded, and to lock the sleeve 20 at a second position, shown in FIG. 4, at which the distal end portion is contracted. The detent mechanism 74 preferably includes a circumferential groove 76 formed in the outer surface of the piston 12 at the central portion thereof, and detent balls 78 disposed within respective holes 80 in the small diameter portion 52 of the body member 16. The groove 76 includes a ramped end surface 82 for forcing the detent balls 78 from the groove 76 as will be described below. Although the coupling is illustrated and described as using a plurality of detent balls, a single detent ball could be used if desired. In addition, while the detent mechanism 74 is illustrated as being a ball detent mechanism, other detent mechanisms could be used, such as a detent mechanism utilizing one or more detent pins.

The detent mechanism 74 engages with the sleeve 20 to hold the split collet assembly open when the coupling is not under pressure, and to lock the sleeve 20 in position to prevent disconnection of the coupling 10 while under pressure. The sleeve 20 includes a radially inward projecting detent shoulder 84 which surrounds the small diameter portion 52 of the body member 16 and is slideable relative thereto. A snap ring 86 disposed around the end of the small diameter portion 52 of the body member 16 engages the detent shoulder 84 to retain the sleeve 20 on the body member.

As can be seen in FIG. 2, when the sleeve 20 is pulled all the way to the left and the piston 12 is at the disengaged position, the detent balls 78 are disposed on the outer surface of the piston, out of the groove 76, such that the shoulder 84 is disposed between the detent balls 78 and the snap ring 86. Thus, movement of the sleeve 20 to the right in order to contract the distal end of the collet assembly 18 is prevented until the piston 12 is moved to the left to allow the detent balls 78 to drop into the groove 76. However, as is shown in FIG. 4, the detent balls 78 are forced out of the groove 76 when the piston moves further to the left, to the pressurized position, and onto the outer surface of the piston in front of the groove such that the detent balls 78 are disposed behind the shoulder 84. Thus, movement of the sleeve 20 to the left to allow disconnection is prevented until the pressure is released and the spring 60 can bias the piston 12 back to the position shown in FIG. 3.

The operation of the coupling 10 will now be described with reference to FIGS. 2–4. FIG. 2 illustrates the coupling in a fully open, disengaged position to allow connection of the fluid line 44 therewith. The fluid line 44 will be described herein as being stationary or fixed, with the coupling 10 being forced onto the end of the fluid line. In the position shown in FIG. 1, the piston 12 and the piston guide 14 are biased to the right by the springs 60 and 62, respectively, and the distal end portion 64 extends beyond the front of the sleeve 20 and is expanded by the elastic retainer 66. Further, the detent shoulder 84 of the sleeve 20 is disposed adjacent the snap ring 86, and the detent balls 78 are disposed out of the groove 76 on one side of the detent shoulder 84 such that the sleeve is held in this position and cannot move to the right.

As the coupling 10 is pushed onto the fluid line, the piston 12 and the piston guide 14 are forced back into the coupling against the bias of the springs 60,62, until the detent balls 78 drop into the groove 76. Once the balls 78 are in the groove, the sleeve 20 is then allowed to move to the right so as to ride up onto the enlarged diameter portion 68 to thereby contract the collet assembly into gripping contact with the fluid line 44, as shown in FIG. 3.

As the piston guide 14 is forced to the left into the coupling, the collet engaging member 50 slides forward in the groove 48 thereby holding the distal end portion 64 of the split collet assembly 18 open for a sufficient time to allow the coupling to be fully inserted onto the fluid line prior to the distal end portion clamping into engagement with the fluid line. This construction also enables the seal 42 to move with the fluid line 44, due to the biasing force of the spring 62 acting on the piston guide 14, if the fluid line were to move outward or to the right. Such an outward movement of the fluid line 44 is possible due to the threads formed on the interior surface of the collet assembly and the exterior surface of the fluid line. When trying to grip into a helix (or threads) with a helix, it is possible for the fluid line to move either in or out the distance of about half a thread, due to interference between the threads. This movement due to the interference needs to be accounted for in order for the coupling 10 to work reliably. However, when the collet and fluid line are not threaded, but instead rely upon mating shoulders or the like for connection, the collet engaging member 50 can be eliminated.

Thus, as the sleeve 20 is being pushed to the right, it starts to contract the distal end portion of the split collet assembly, which pushes the member 50 forward in the groove 48. After the piston guide 14 is pushed in far enough for the split collet assembly to fully contract, the member 50 is towards the front of the groove. If the fluid line were to move outward half of a thread, then the piston guide 14 would follow such movement because the member 50 has room to slide back in the groove 48.

In the position shown in FIG. 3, the coupling 10 is connected to the fluid line 44 with no pressurized fluid flowing through coupling, with the seal 42 engaging the front face of the fluid line to provide a fluid tight connection. If the connection is not sufficiently tight or if leaks occur once pressurized fluid flows, the sleeve 20 can be rotated, which rotates the split collet assembly 18 due to the pins 72, thereby tightening the coupling onto the fluid line due to the threads therebetween.

Once the coupling is connected to the fluid line as shown in FIG. 3, pressurized fluid can then be introduced. The coupling 10 has been designed to be used with higher pressures, and therefore the coupling is provided with safety features to prevent it from being disconnected while under pressure. When pressurized fluid is introduced, the fluid engages the pressure surface 36 of the piston 12, thereby forcing the piston to the left from the shown in FIG. 3 to the pressurized position shown in FIG. 4. As the piston 12 is forced to the pressurized position, the ramped end surface 82 forces the detent balls 78 radially from the groove 76 and to a position directly behind the detent shoulder 84 of the sleeve 20, with the detent balls 78 eventually resting upon the outer surface of the piston 12 so that they are retained behind the detent shoulder. As long as the coupling is under pressure, the detent balls 78 are retained behind the detent shoulder 84, and the sleeve 20 cannot be pulled backward, or to the left, thereby preventing disconnection of the coupling. To disconnect the coupling, the pressure must be released, which allows the piston 12 to be forced to the position shown in FIG. 3 by the spring 60, with the detent balls dropping into the groove and permitting the sleeve to be pulled backward, thus releasing the connection.

The sloped groove 30 facilitates relative movements of the piston and piston guide by reducing the squeeze on the o-ring 32 and thereby reducing the friction on the piston and piston guide. The pressurized fluid however will contact the o-ring and push the o-ring to the left up the ramp to increase the squeeze on the o-ring as the pressure increases.

The embodiment of FIGS. 1–5 has been described as having a main seal 42 that engages a front face of the fluid line 44 to provide a seal between the coupling and the fluid line. However other main seal configurations are possible. FIG. 6 illustrates an alternate embodiment of the coupling in which elements corresponding to those in FIGS. 1–5 are referenced by the same reference numeral with a prime designation. The coupling is designed for sealing engagement with an interior surface of a fluid line 44'. The extension portion 38' of the piston guide 14' includes a forward projection 88 which is sized to extend into the end of the fluid line 44'. The projection 88 is formed by an integral extension of the extension portion 38'. The main seal 42', which can be an o-ring, a washer shaped seal, and the like, is disposed around an end of the forward projection 88 and engages with an interior surface 90 of the fluid line to provide a sealed connection between the coupling and the fluid line. Since the main seal 42' contacts an interior surface of the fluid line, the retainer 46 used with the embodiment of FIGS. 1–4 is not required. The coupling is otherwise similar to the coupling of FIGS. 1–5. Other embodiments could seal externally on the fluid line.

Figure 7:
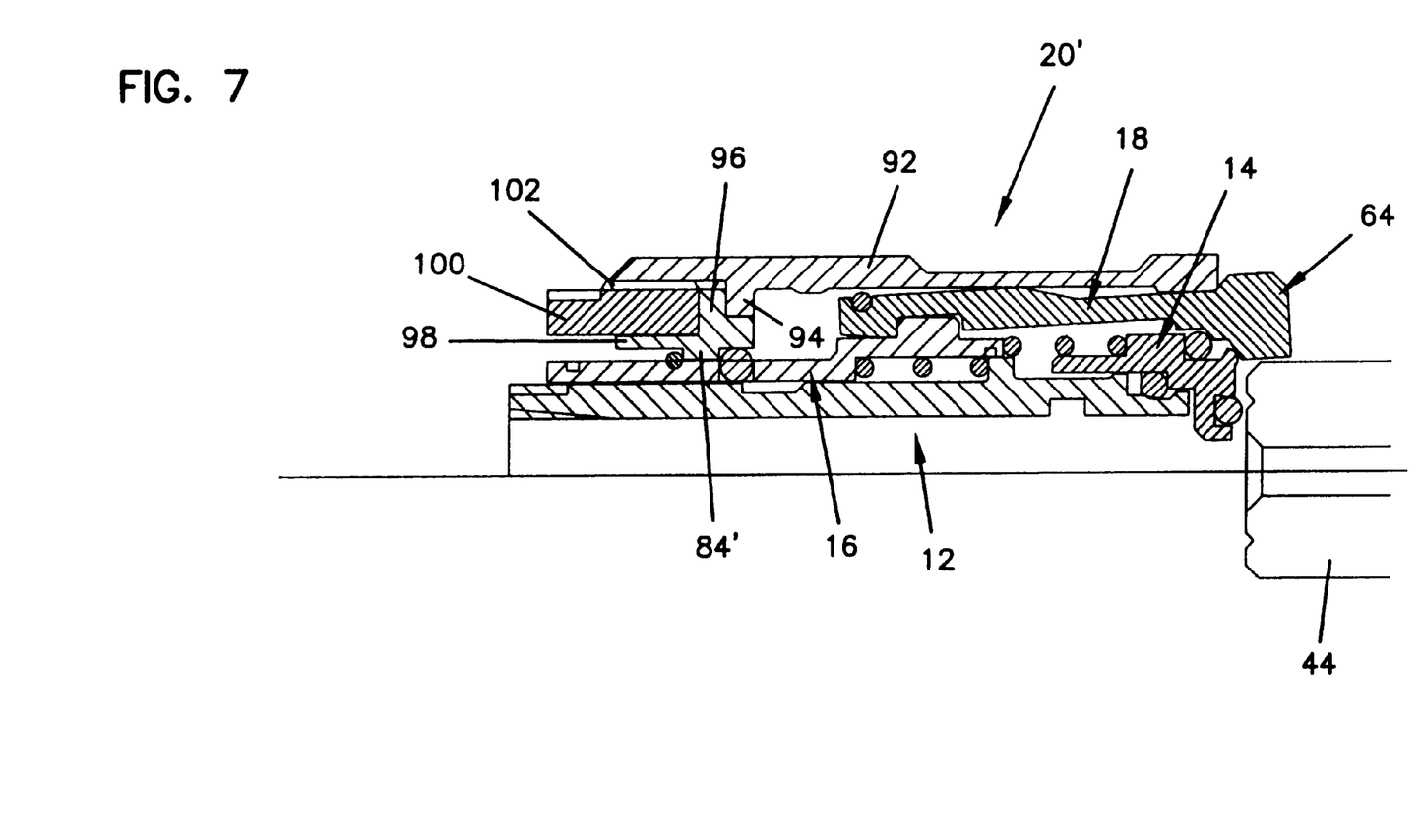
FIG. 7 illustrates yet another embodiment of the high pressure coupling.

FIG. 7 illustrates an embodiment that is similar to the embodiment of FIGS. 1–5, except that the coupling is designed with a modular sleeve 20' to expand the range of uses of the coupling. The modular sleeve 20' is formed by a tubular main sleeve portion 92 which extends over the split collet assembly 18 for actuating the distal end portion 64 thereof to the contracted position. The main sleeve portion 92 includes a radially inward extending shoulder 94 adjacent the rear end thereof, and a ring portion 96 is slid into the interior of the main sleeve portion 92 and abuts against the shoulder 94. The ring portion 96 defines the detent shoulder 84' for the modular sleeve 20'. A flange 98 extends rearwardly from the ring portion 96 and is radially spaced the interior surface of the main sleeve portion 92 to define a gap therebetween, and a locking ring 100 is secured in the gap to lock the ring portion 96 against the shoulder 94 of the main sleeve portion 92. Preferably, the locking ring 100 is secured within the gap by screw threads 102 formed on the interior surface of the main sleeve portion 92 and on the exterior surface of the locking ring 100. Thus, by simply unscrewing the locking ring 100, the ring portion 96 can be removed, allowing the main sleeve portion 92 to be withdrawn from the coupling. The structure and operation of the coupling is otherwise similar to the coupling of the first embodiment.

As will be explained with regard to FIGS. 8A–C and 9A–C, the modular sleeve 20' allows the coupling to be modified in a manner that permits the coupling to be operated by various mechanical actuating devices, with the sleeve 20' being stationary instead of moveable as in the embodiments of FIGS. 1–7.

Figure 8A:
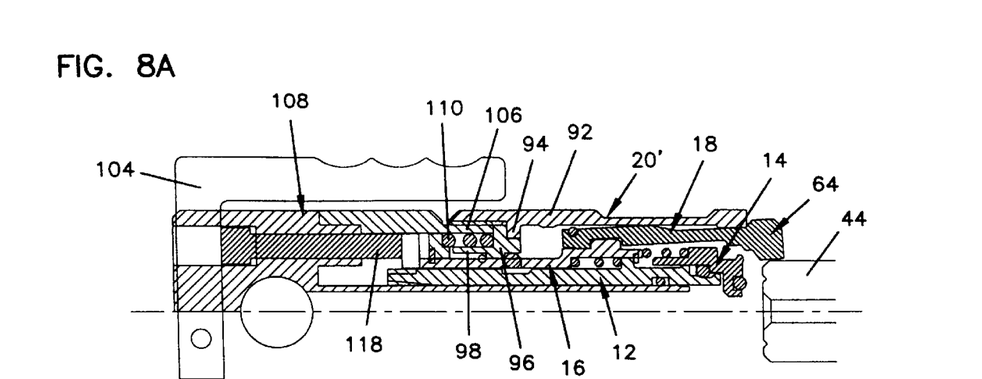
FIGS. 8A, 8B and 8C illustrate a handle operated high pressure coupling.
Figure 8B:
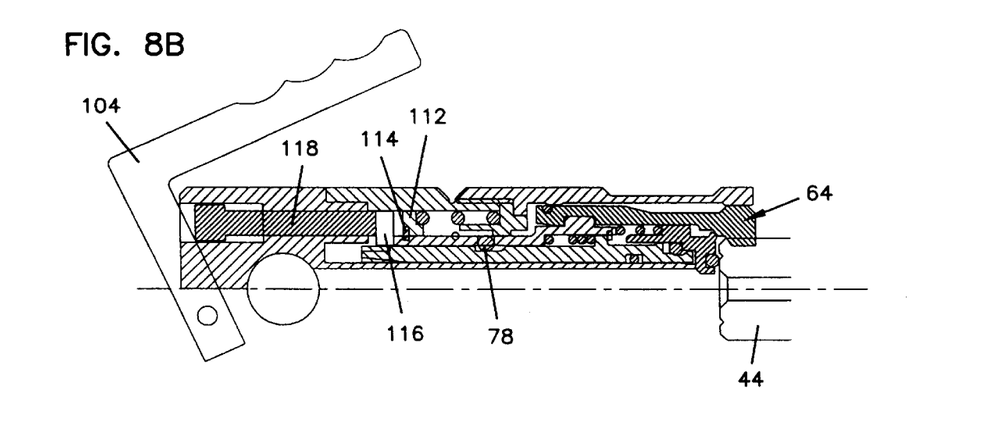
Figure 8C:
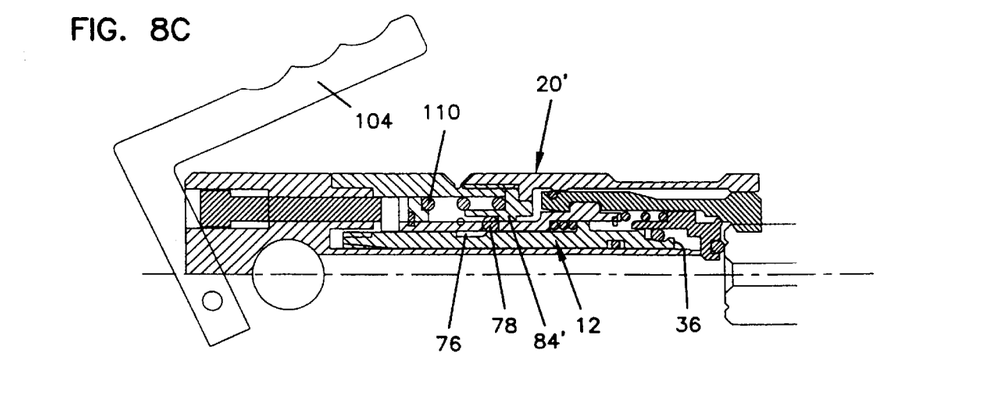

FIGS. 8A–C illustrate a handle operated coupling, in which a handle 104 is squeezed to open the distal end portion 64 of the split collet assembly 18 to permit connection or disconnection of the fluid line 44, and when the handle 104 is released the split collet assembly is contracted to achieve connection. The modular sleeve 20' includes the main sleeve portion 92 and the ring portion 96, as in the embodiment of FIG. 7, however the locking ring 100 is removed, and a front sleeve 106 of a stationary housing 108 is instead threaded into the end of the main sleeve portion to retain the ring portion 96 in place.

The front sleeve 106 is spaced outwardly from the flange 98 of the ring portion 96, and a coil spring 110 is disposed within the gap therebetween. The spring 110 is engaged against the ring portion 96 at one end, and engages at its opposite end against a washer 112 that is secured adjacent to the end of the body member 16 by a retaining ring 114. The coil spring 110 thus biases the internal components of the coupling to the left in FIG. 8A, tending to withdraw the internal components into the main sleeve portion 92 and force the split collet assembly to the contracted position.

A further washer 116 engages against the end of the body member 16, and an actuating pin 118 slideably extends through the housing 108 and into engagement with the washer 116. The opposite end of the actuating pin 118 is engaged against the handle 104 which is pivotally connected to the housing 108 for pivoting movement between the positions shown in FIGS. 8A and 8B.

Operation of the coupling of FIGS. 8A–C is as follows. When the handle 104 is squeezed, if forces the actuating pin 118 to the right, which pushes against the washer 116 and causes the body member 16, piston 12, piston guide 14, and split collet assembly 18 to move to the right until the distal end portion 64 extends past the main sleeve portion 92, thereby expanding the distal end portion, as is shown in FIG. 8A. After pushing the coupling onto the fluid line 44, the handle 104 is released, and the spring 110 forces the internal components to the left back into the main sleeve portion 92, thereby contracting the split collet assembly 18 to engage the fluid line, as shown in FIG. 8B. FIG. 8C illustrates the coupling under pressure, with pressurized fluid acting against the pressure surface 36 to force the piston 12 to the left so that the detent balls 78 are disposed behind the detent shoulder 84' thereby locking the body member 16 to the main sleeve portion 92 and preventing disconnection of the coupling until the pressure is released. It is to be realized that the sleeve 20' in this embodiment is connected to the housing 108 and is therefore stationary, and that the handle 104 and spring 110 cause movement of the internal components of the coupling relative to the sleeve 20' to expand and contract the split collet assembly.

Figure 9A:
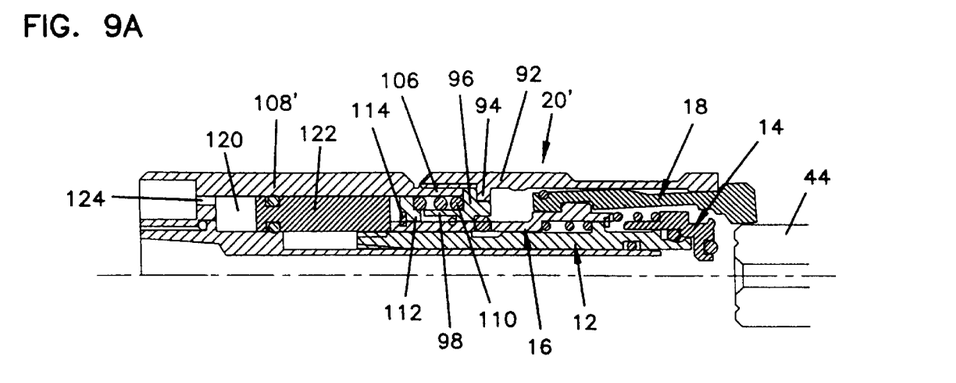
FIGS. 9A, 9B and 9C illustrate a pneumatic operated high pressure coupling.
Figure 9B:
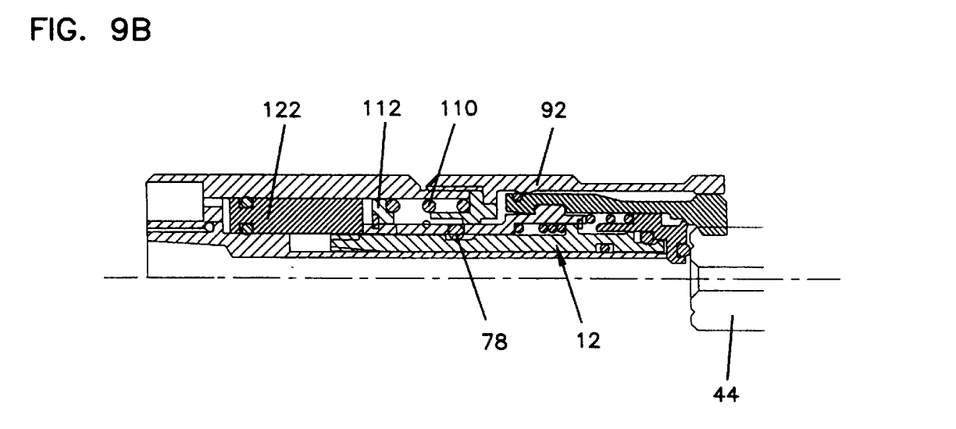
Figure 9C:
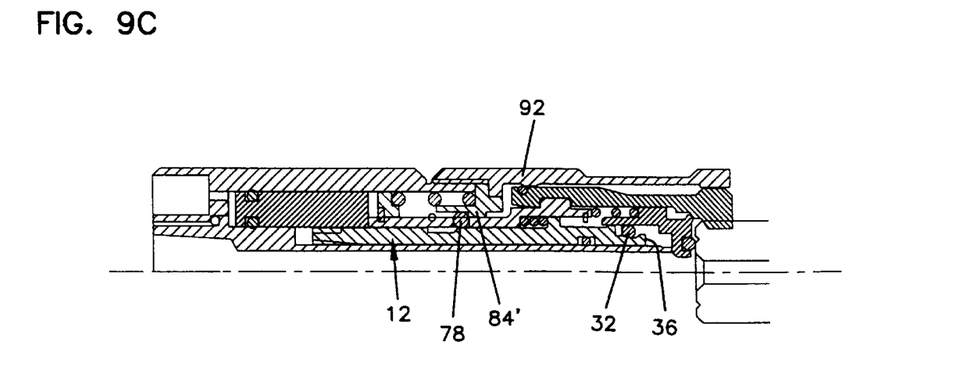

FIGS. 9A–C illustrate yet another alternate embodiment, in which the modular sleeve is modified to form a pneumatic operated coupling. Similar to the handle operated coupling, a front sleeve 106' of a stationary pneumatic housing 108' is threaded into the end of the main sleeve portion 92 to retain the ring portion 96 in place. The washer 112 is secured adjacent to the end of the body portion 16 by the retaining ring 114, and the spring 110 is engaged between the washer 112 and the ring portion 96.

The stationary pneumatic housing 108' defines a cylinder 120 and a piston 122 is disposed within the cylinder 120 and engages against the end of the body member 16. A fluid port 124 communicates with the cylinder 120 to allow the introduction or discharge of pressurized fluid, such as air, to the cylinder to control the position of the piston 122. Although the coupling is described herein as being pneumatically operated, the coupling could also be hydraulically operated if desired.

As illustrated in FIG. 9A, upon the introduction of pressurized fluid to the cylinder 120, the piston 122 is forced to the right which pushes the body member 16 and the other internal components of the coupling to the right until the distal end portion 64 of the split collet assembly 18 is expanded, to permit connection with the fluid line 44. After pushing the coupling onto the fluid line, the pressurized fluid is released from the cylinder 120, thereby allowing the spring 110 to bias the body member 16 and the other internal components, as well as the piston 122, to the left, thereby contracting the split collet assembly and completing the connection, as shown in FIG. 9B. When pressurized fluid is introduced through the fluid line 44, the piston 12 is forced further to the left by the pressurized fluid acting on the pressure surface 36, to lock the body member to the sleeve 20', thereby preventing disconnection until the pressure is released. Again, like the embodiment of FIGS. 8A–C, the sleeve 20' is stationary, and the internal components are moveable relative to the sleeve 20' during the connection with the fluid line.

Figure 10A:
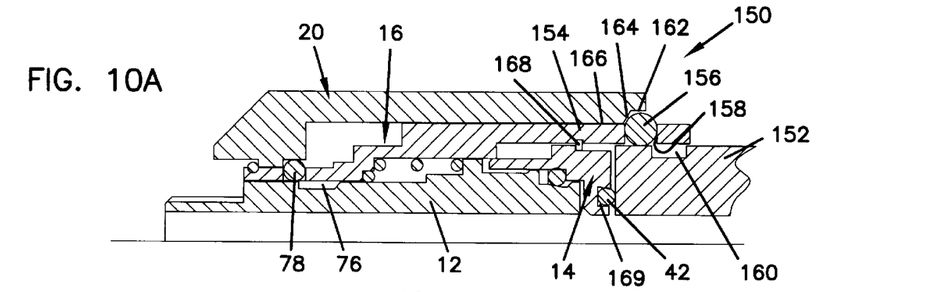
FIGS. 10A and 10B illustrate yet another embodiment of the high pressure coupling, utilizing a ball detent coupling assembly.
Figure 10B:
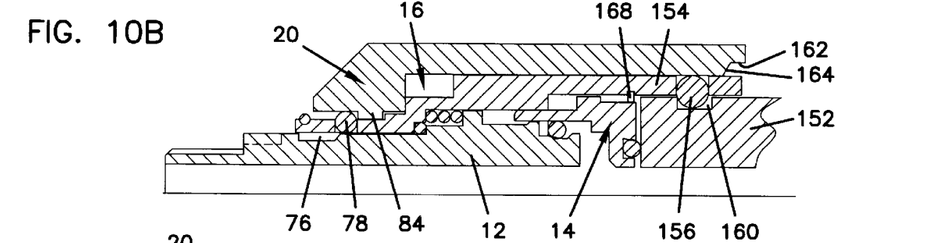

FIGS. 10A and 10B illustrate an embodiment in which the split collet assembly 18 is eliminated. The high pressure coupling of this embodiment instead utilizes a ball detent coupling assembly 150 to couple the high pressure coupling and a fluid line 152. The ball detent coupling assembly 150 includes a tubular extension portion 154 formed integrally with the body member 16 and extending forwardly therefrom between the sleeve 20 and the piston guide 14. A detent ball 156 is disposed within a hole 158 formed adjacent the end of the tubular extension 154 and is radially moveable therein. Although a single detent ball 156 and hole 158 are shown, it should be realized that the tubular extension 154 could includes a plurality of circumferentially spaced detent balls 156 and holes 158. In addition, a pin detent coupling assembly could be used in place of the ball detent coupling assembly if desired.

The fluid line 152 is formed with a circumferential detent groove 160 formed in the exterior surface thereof, adjacent its end. The groove 160 is sized to receive the detent ball 156 therein, so as to couple or secure the fluid line 152 to the high pressure coupling, as shown in FIG. 10B. The detent ball 156 is forced radially downward into the groove by the sleeve 20, which is slideably disposed on the outer surface of the tubular extension 154. The sleeve 20 includes a large radius portion 162 at its end which allows the detent ball 156 to move radially outward when the coupling is initially pushed onto the fluid line 152, as is shown in FIG. 10A. An angled actuating surface 164 leads from the large radius portion 162 to a smaller diameter portion 166 of the interior surface of the sleeve 20 that is disposed on the outer surface of the tubular extension 154. A snap ring 168, secured to the interior circumference of the tubular extension 154, limits movement of the piston guide 14 to the right, thereby preventing the piston guide 14 from being removed through the end of the coupling until the snap ring 168 is removed. Further, a groove 169 is defined in the forward face of the piston guide 14 and receives the main seal 42 therein, to thereby retain the main seal 42.

FIG. 10A illustrates the coupling in an open, unlocked condition with the ball detent coupling assembly 150 being in an uncoupled configuration and the fluid line 152 disposed in the end of the coupling. As noted in FIG. 10A, the detent ball 78 is positioned to hold the sleeve 20 at its disengaged position, like in the embodiment of FIG. 2. As the coupling is pushed further onto the fluid line 152, the piston guide 14 and tubular piston 12 are forced back into the coupling, so that the detent ball 78 drops into the groove 76. Once the ball 78 drops into the groove 78, the sleeve 20 is allowed to move to the right so that the actuating surface 164 forces the detent ball 156 into the groove 160 so that the coupling assembly 150 is in a coupled configuration, thereby coupling the fluid line 152 and the high pressure coupling. The small diameter portion 166 of the tubular extension 154 will now be disposed over the detent ball 156, thereby maintaining the detent ball within the groove 160. Upon the introduction of pressurized fluid, the tubular piston 12 is forced back to its pressurized position, which forces the detent ball 78 radially outward, behind the shoulder 84 as shown in FIG. 10B, so that the coupling cannot be disconnected under pressure. Thus, this embodiment functions like the previous embodiment shown in FIGS. 1–4.

As is evident from FIGS. 10A, 10B, since the ball detent coupling assembly 150 does not radially expand and contract, and therefore does not need to be held open, the collet engaging member 50 and elastic retainer 66 can be eliminated and the body member 16 and coupling assembly 150 can be made in one-piece, thereby simplifying the coupling.

Figure 11:
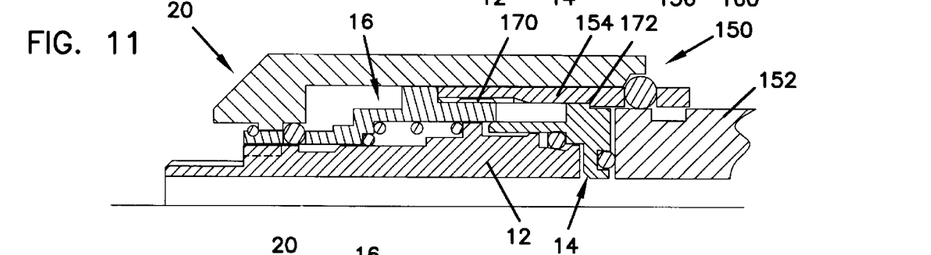
FIG. 11 illustrates an embodiment of the high pressure coupling shown in FIGS. 10A and 10B, where the body member and the detent coupling assembly are detachably connected.

FIG. 11 illustrates an embodiment similar to FIGS. 10A, 10B, but instead of being an integral one-piece construction, the body member 16 and the tubular extension 154 are detachably secured to each other by engaging threads 170 formed on the body member and the tubular extension. Further, the tubular extension 154 is formed with an inwardly extending shoulder 172 on the interior surface thereof which engages with the piston guide member 14 to limit movement of the piston guide 14 to the right, thereby preventing the piston guide 14 from being removed through the end of the coupling until the tubular extension 154 is detached from the body member 16.

Figure 12:
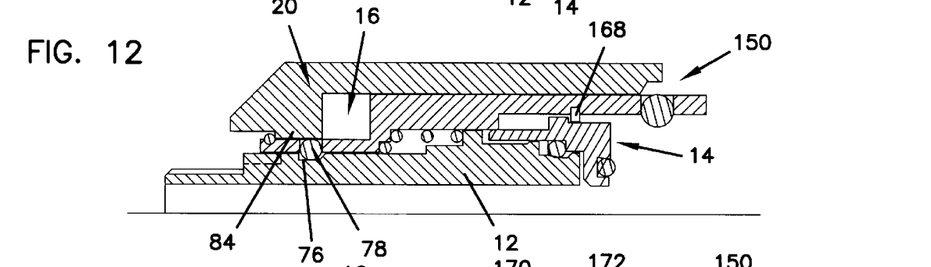
FIG. 12 illustrates another embodiment of the high pressure coupling of FIG. 10.

With reference now to FIG. 12, an embodiment similar to FIGS. 10A and 10B is shown, however the shoulder 84 on the sleeve 20 is enlarged and the groove 76 in the tubular piston 12 is located so that when the high pressure coupling is at the open, disengaged position, the detent ball 78 is positioned in the groove 76, underneath the shoulder 84. Thus, the detent ball 78 does not hold the sleeve 20 at the disengaged position, but instead serves to lock the sleeve at the engaged position only, so that the coupling cannot be disconnected under pressure.

Figure 13:
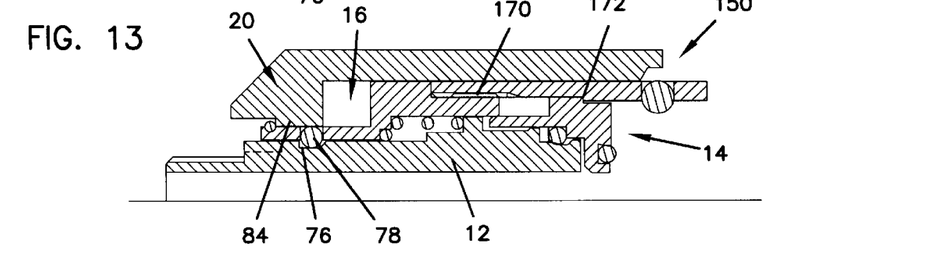
FIG. 13 illustrates another embodiment of the high pressure coupling of FIG. 11.

FIG. 13 illustrates an embodiment similar to FIG. 11, but utilizing the detent ball 78 and shoulder 84 arrangement shown in FIG. 12.

It is to be understood that while certain embodiments of the present invention have been illustrated and described, the invention is not limited to the specific forms or arrangements of the parts described and shown.

We claim:

1. A high pressure coupling for coupling with a fluid line, comprising:

a tubular piston having a longitudinal axis and first and second opposite ends, said tubular piston being moveable between a disengaged position and a pressurized position;

a coupling mechanism surrounding the first end of the tubular piston, said coupling mechanism having an un-coupled configuration and a coupled configuration;

a sleeve engaged with said coupling mechanism controlling operation of said coupling mechanism, said sleeve being moveable between a first position at which the coupling mechanism is in the un-coupled configuration and a second position at which the coupling mechanism is in the coupled configuration;

a detent mechanism actuatable by said tubular piston, said detent mechanism being engageable with said sleeve at the disengaged position of said tubular piston to hold said sleeve at the first position and said detent mechanism being engageable with said sleeve at the pressurized position of said tubular piston to hold said sleeve at the second position; and a body member disposed around the tubular piston, said coupling mechanism being connected to said body member, and said sleeve being disposed around the body member and slideably disposed on an outer surface thereof.

2. A high pressure coupling for coupling with a fluid line, comprising:

a tubular piston having a longitudinal axis and first and second opposite ends, said tubular piston being moveable between a disengaged position and a pressurized position;

a coupling mechanism surrounding the first end of the tubular piston, said coupling mechanism having an un-coupled configuration and a coupled configuration;

a sleeve engaged with said coupling mechanism controlling operation of said coupling mechanism, said sleeve being moveable between a first position at which the coupling mechanism is in the un-coupled configuration and a second position at which the coupling mechanism is in the coupled configuration; and a detent mechanism actuatable by said tubular piston, said detent mechanism being engageable with said sleeve at the disengaged position of said tubular piston to hold said sleeve at the first position and said detent mechanism being engageable with said sleeve at the pressurized position of said tubular piston to hold said sleeve at the second position, wherein the first end of said tubular piston includes a pressure surface which faces towards the fluid line whereby the tubular piston is actuatable in a direction away from the fluid line when the pressure surface is acted upon by a pressurized fluid.

3. The high pressure coupling according to claim 2, further comprising a body member disposed around the tubular piston, said coupling mechanism being connected to said body member, and said sleeve being disposed around the body member and slideably disposed on an outer surface thereof.

4. The high pressure coupling according to claim 3, further comprising a spring surrounding the tubular piston, the spring being engaged with the body member and the tubular piston so as to bias the tubular piston toward the disengaged position.

5. The high pressure coupling according to claim 4, wherein a working fluid is flowable through the tubular piston, and the spring is not wetted by the working fluid.

6. The high pressure coupling according to claim 3, further comprising a shock absorbing member between the body member and the tubular piston.

7. The high pressure coupling according to claim 3, wherein the detent mechanism comprises a groove formed in an outer surface of the tubular piston and at least one detent member disposed within a hole in the body member, said detent member being engageable within said groove.

8. The high pressure coupling according to claim 7, wherein the detent member is disposed out of said groove at the disengaged position and the pressurized position of said tubular piston.

9. The high pressure coupling according to claim 8, wherein the sleeve includes a detent shoulder, and said detent member being disposed on one side of said detent shoulder at the disengaged position of the tubular piston, and said detent member being disposed on an opposite side of said detent shoulder at the pressurized position of the tubular piston.

10. The high pressure coupling according to claim 3, further including a piston guide disposed around the first end of the tubular piston and surrounded by said coupling mechanism.

11. The high pressure coupling according to claim 10, further comprising a spring surrounding the tubular piston and engaged between the body member and the piston guide, said spring biasing the piston guide away from the body member.

12. The high pressure coupling according to claim 11, wherein a working fluid is flowable through the tubular piston, and the spring is not wetted by the working fluid.

13. The high pressure coupling according to claim 10, further including a main seal connected to an end of said piston guide, and means for retaining the main seal on the piston guide.

14. The high pressure coupling according to claim 13, wherein said means for retaining comprises a circumferential ring disposed on an outer perimeter of said main seal.

15. The high pressure coupling according to claim 13, wherein said means for retaining comprises a groove formed in an end of said piston guide, said main seal being disposed with said groove.

16. The high pressure coupling according to claim 10, further including a seal disposed in a circumferential groove formed in an outer surface of the tubular piston for preventing leakage between the tubular piston and the piston guide.

17. The high pressure coupling according to claim 16, wherein said circumferential groove includes a bottom wall that is sloped toward the first end of the tubular piston, and said seal is moveable within said circumferential groove along said sloped bottom wall.

18. The high pressure coupling according to claim 10, wherein the coupling mechanism comprises a split collet coupling assembly having a distal end portion that is radially expandable and contractable to define said un-coupled configuration and said coupled configuration, respectively.

19. The high pressure coupling according to claim 18, further comprising at least one pin extending between the sleeve and the split collet assembly to ensure integral rotation of the sleeve and the split collet assembly.

20. The high pressure coupling according to claim 18, further including a circumferential groove formed in an outer surface of the piston guide, and a collet engaging member disposed within said circumferential groove and engageable with said split collet assembly for holding the distal end portion thereof expanded.

21. The high pressure coupling according to claim 10, wherein the coupling mechanism comprises a detent coupling assembly having a tubular extension and at least one detent member arranged on said tubular extension.

22. The high pressure coupling according to claim 21, wherein the tubular extension and the body member are a one-piece, integral construction.

23. The high pressure coupling according to claim 21, wherein the tubular extension and the body member are detachably connected.

24. The high pressure coupling according to claim 21, further comprising a shoulder defined on said tubular extension for limiting movement of said piston guide.

25. The high pressure coupling according to claim 24, wherein said shoulder comprises a snap-ring secured to said tubular extension.

26. The high pressure coupling according to claim 24, wherein said shoulder is integrally formed on said tubular extension.

27. A high pressure coupling for coupling with a fluid line, comprising:
- a tubular piston having a longitudinal axis and first and second opposite ends, said tubular piston being moveable between a disengaged position and a pressurized position;
- a coupling mechanism surrounding the first end of the tubular piston, said coupling mechanism having an un-coupled configuration and a coupled configuration;
- a sleeve engaged with said coupling mechanism controlling operation of said coupling mechanism, said sleeve being moveable between a first position at which the coupling mechanism is in the uncoupled configuration and a second position at which the coupling mechanism is in the coupled configuration;
- a sleeve locking mechanism actuatable by said tubular piston, said sleeve locking mechanism being engageable with said sleeve at the pressurized position of said tubular piston to hold said sleeve at the second position; and
- wherein the first end of said tubular piston includes a pressure surface which faces towards the fluid line whereby the movement of tubular piston from the disengaged position to the pressurized position occurs in a direction away from the fluid line when the pressure surface is acted upon by a pressurized fluid.

28. The high pressure coupling according to claim 27, wherein the coupling mechanism comprises a split collet assembly.

29. The high pressure coupling according to claim 27, wherein the coupling mechanism comprises a detent coupling assembly.

* * * * *